United States Patent
Miyamoto et al.

(10) Patent No.: US 9,193,828 B2
(45) Date of Patent: Nov. 24, 2015

(54) POLYIMIDE PRECURSOR COMPOSITION, POLYIMIDE-MOLDED PRODUCT, AND IMAGE FORMING APPARATUS

(75) Inventors: Tsuyoshi Miyamoto, Kanagawa (JP); Katsumi Nukada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 256 days.

(21) Appl. No.: 13/601,480

(22) Filed: Aug. 31, 2012

(65) Prior Publication Data

US 2013/0230724 A1  Sep. 5, 2013

(30) Foreign Application Priority Data

Mar. 2, 2012 (JP) ................................. 2012-047126

(51) Int. Cl.
| | | |
|---|---|---|
| B60C 1/00 | (2006.01) |
| C08K 3/00 | (2006.01) |
| C08G 73/10 | (2006.01) |
| C08K 3/04 | (2006.01) |
| C09D 179/08 | (2006.01) |
| C08L 79/08 | (2006.01) |
| G03G 15/00 | (2006.01) |
| G03G 15/16 | (2006.01) |
| G03G 15/01 | (2006.01) |

(52) U.S. Cl.
CPC . *C08G 73/10* (2013.01); *C08K 3/04* (2013.01); *C08L 79/08* (2013.01); *C09D 179/08* (2013.01); *G03G 15/00* (2013.01); *G03G 15/0189* (2013.01); *G03G 15/16* (2013.01); *G03G 15/162* (2013.01); *G03G 2215/0129* (2013.01); *Y10T 428/31504* (2015.04)

(58) Field of Classification Search
CPC . G03G 15/0189; G03G 15/162; G03G 15/00; G03G 15/16; G03G 2215/0129; C08K 3/04; C08G 73/10; C08L 79/08; C09D 179/08; Y10T 428/31504
USPC ................................................. 524/495, 424
See application file for complete search history.

(56) References Cited

U.S. PATENT DOCUMENTS

| | | | |
|---|---|---|---|
| 4,238,528 A | 12/1980 | Angelo et al. | |
| 4,600,770 A | 7/1986 | Gagliani et al. | |
| 5,463,016 A | 10/1995 | Tomioka et al. | |
| 5,466,732 A | 11/1995 | Tomioka et al. | |
| 6,436,593 B1* | 8/2002 | Minegishi et al. ............. 430/18 |
| 2002/0141784 A1* | 10/2002 | Kusayanagi et al. ......... 399/179 |
| 2005/0170274 A1* | 8/2005 | Matsumura et al. .......... 430/126 |
| 2007/0178264 A1* | 8/2007 | Nishiura et al. ............. 428/35.5 |
| 2009/0246554 A1* | 10/2009 | Furukawa et al. ............ 428/656 |
| 2009/0263745 A1* | 10/2009 | Sakayori .................... 430/281.1 |
| 2011/0281218 A1 | 11/2011 | Sakayori |

FOREIGN PATENT DOCUMENTS

| | | |
|---|---|---|
| JP | B-47-19710 | 6/1972 |
| JP | A-58-162659 | 9/1983 |
| JP | A-61-168669 | 7/1986 |
| JP | A-06-001915 | 1/1994 |
| JP | A-08-015519 | 1/1996 |
| JP | A-08-120077 | 5/1996 |
| JP | A-2000-212216 | 8/2000 |
| JP | A-2000-319391 | 11/2000 |
| JP | A-2003-013351 | 1/2003 |
| JP | 2005-247986 A | 9/2005 |
| JP | 2005-247988 A | 9/2005 |
| JP | 2009-242549 A | 10/2009 |
| JP | A-2009-242539 | 10/2009 |
| JP | A-2009-242542 | 10/2009 |
| JP | A-2009-244479 | 10/2009 |
| JP | A-2009-263646 | 11/2009 |
| JP | A-2009-265637 | 11/2009 |
| JP | A-2010-083920 | 4/2010 |
| JP | A-2010-85430 | 4/2010 |

OTHER PUBLICATIONS

Sroog, "Polyimides," Journal of Polymer Science, Macromolecular Reviews, 1976, vol. 11, pp. 161-208.
Sep. 1, 2015 Office Action issued in Japanese Application No. 2012-047126. X.

* cited by examiner

*Primary Examiner* — Alexander Kollias
(74) *Attorney, Agent, or Firm* — Oliff PLC

(57) ABSTRACT

A polyimide precursor composition includes a polyimide precursor including a repeating unit represented by the following Formula (1), a solvent, and acidic carbon black having a pH of 5.0 or less,

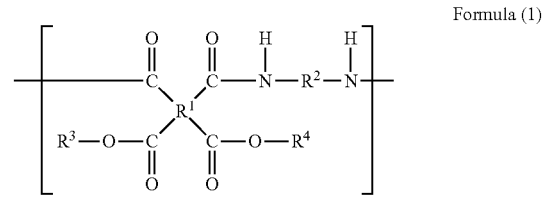

Formula (1)

wherein $R^1$ represents a tetravalent organic group, $R^2$ represents a divalent organic group, each of $R^3$ and $R^4$ independently represents a monovalent organic group or hydrogen, and $R^3$ and $R^4$ are not hydrogen at the same time.

12 Claims, 3 Drawing Sheets

POLYIMIDE PRECURSOR COMPOSITION, POLYIMIDE-MOLDED PRODUCT, AND IMAGE FORMING APPARATUS

CROSS-REFERENCE TO RELATED APPLICATIONS

This application is based on and claims priority under 35 USC 119 from Japanese Patent Application No. 2012-047126 filed Mar. 2, 2012.

BACKGROUND

1. Technical Field

The present invention relates to a polyimide precursor composition, a polyimide-molded product, and an image forming apparatus.

2. Related Art

A polyimide resin is a material having characteristics of being excellent in high durability and heat resistance, and is widely used for electronic materials such as a TAB film.

Since cohesion between polyimide resin molecules having a structure that is rigid and highly symmetric is strong, and the polyimide resin is not melted by heating (infusiblity) and does not dissolve in various solvents (insolubility), so processability of this resin is poor.

An attempt at performing molecular modification on polyamic acid as a polyimide precursor and using it by dissolving the polyamic acid in a solvent other than NMP, dimethylacetamide (DMAc), dimethylformamide (DMF), dimethylsulfoxide (DMSO), abd γ-butyrolactone (γ-BL) has been proposed.

SUMMARY

According to an aspect of the invention, there is provided a polyimide precursor composition including a polyimide precursor including a repeating unit represented by the following Formula (1); a solvent; and acidic carbon black having a pH of 5.0 or less,

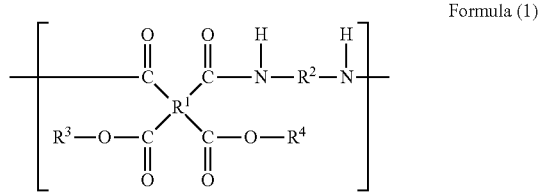

Formula (1)

wherein $R^1$ represents a tetravalent organic group, $R^2$ represents a divalent organic group, each of $R^3$ and $R^4$ independently represents a monovalent organic group or hydrogen, and $R^3$ and $R^4$ are not hydrogen at the same time.

BRIEF DESCRIPTION OF THE DRAWINGS

Exemplary embodiments of the present invention will be described in detail based on the following figures, wherein.

DETAILED DESCRIPTION

Figure 1:
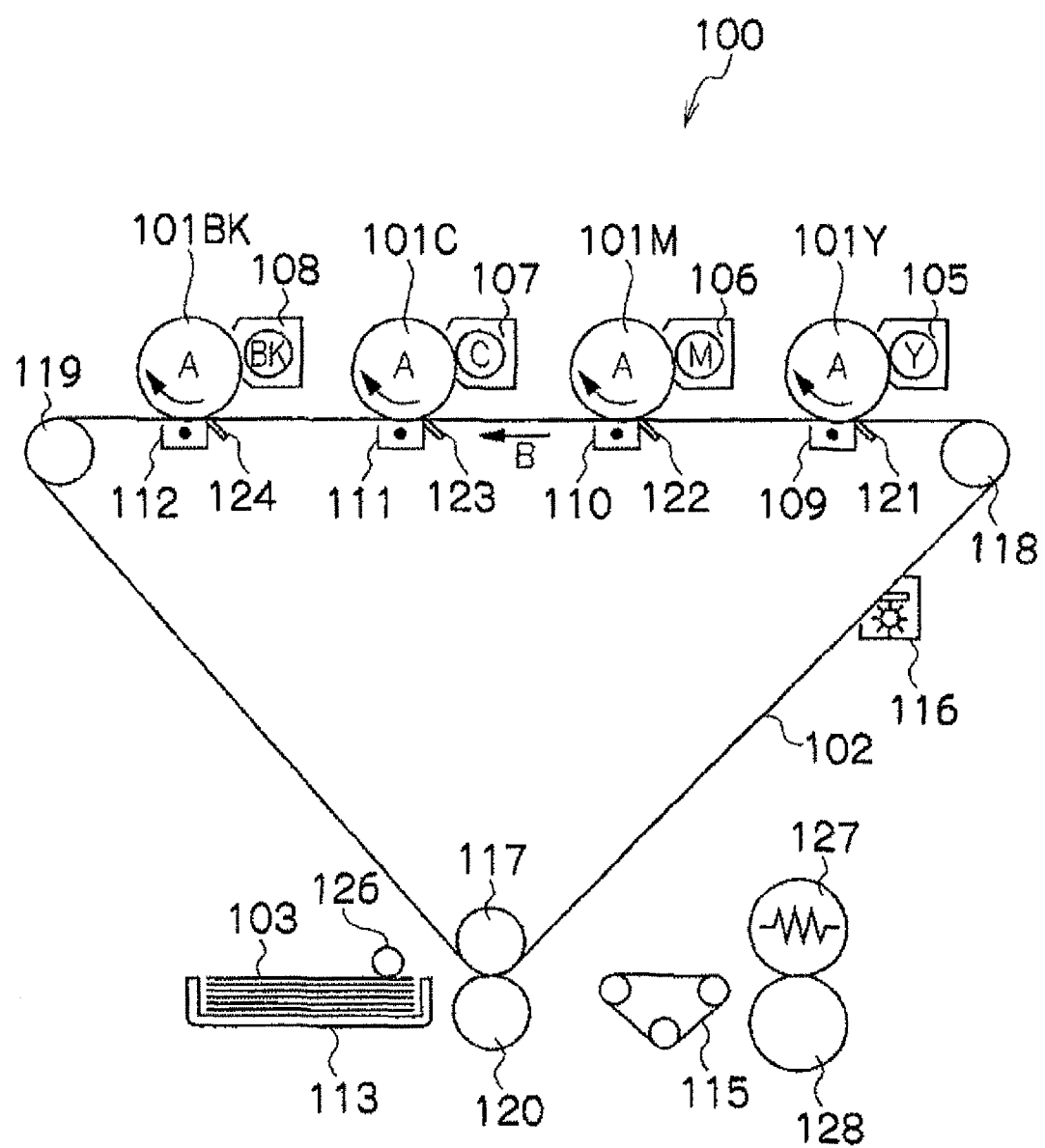
FIG. 1 is a schematic configuration view showing an example of an image forming apparatus according to the present exemplary embodiment.

Hereinbelow, exemplary embodiments of the invention will be described in detail.

Polyimide Precursor Composition

The polyimide precursor composition according to the present exemplary embodiment includes a polyimide precursor including a repeating unit represented by the following Formula (1), a solvent, and acidic carbon black having a pH of 5.0 or less.

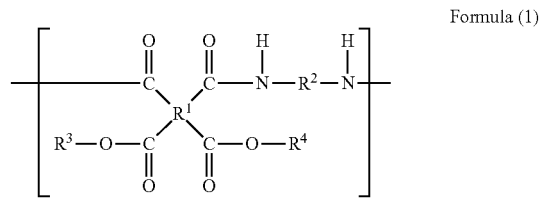

Formula (1)

In Formula (1), $R^1$ represents a tetravalent organic group, and $R^2$ represents a divalent organic group. Each of $R^3$ and $R^4$ independently represents a monovalent organic group or hydrogen, and $R^3$ and $R^4$ are not hydrogen at the same time.

The present inventors have found that by using a polyimide precursor composition that is obtained by allowing hemiacetalized polyamic acid and acidic carbon black having a pH of 5.0 or less to coexist in a solvent, a polyamide-molded product in which carbon black shows high dispersibility is obtained. Though unclear, the reason is assumed to be as below.

Compared to an unmodified polyamic acid, hemiacetalized polyamic acid exhibits higher dispersion stability. The reason is that while acting between a carboxyl group of unmodified polyamic acid and an active point of the surface of acidic carbon black used as a conductive material, a repulsive force is not easily formed in the hemiacetalized polyamic acid. In addition to this due to the interaction between the active point of the surface of acidic carbon black and an —NH— group of an amide group of a polyamic acid main chain, the dispersed state is rather stabilized.

Moreover, by using an amino group, which easily realizes high dispersion stability by interacting with acidic carbon black, for a terminal group structure of a polyamic acid chain, stabilization of the polyimide precursor composition is more improved, which enables long-term storage. In addition, the composition may be stabilized even in solutions containing nitrogen atoms, such as N-methyl-2-pyrrolidone (NMP) and dimethylacetamide (DMAc).

Furthermore, by allowing the acidic carbon black to coexist, a dry film surface is leveled while a solvent or an eliminative group is volatilizing. Consequently, surface roughening of a thick film is inhibited, so a polyimide-molded product of high quality is obtained.

Due to the high dispersion of carbon black as a conductive material, aggregation of carbon black is inhibited even at the time of imide ring closure, hence surface uniformity of the obtained polyimide-molded product is improved, and a mechanical strength is improved since the number of breakage starting points formed by dynamic stress is reduced. Moreover, since the aggregation of carbon black in the polyimide-molded product is inhibited, uniformity in characteristics of electric resistance is heightened, and electric stability (in which electric characteristics do not change even with repeated voltage and current application) is improved.

When light shieldability of the carbon black is utilized, a high shielding effect is obtained even with a small amount of the carbon black being combined.

In addition, damage to a material to be coated (substrate), which is caused when polyimide is subjected to a molding process, is reduced, and the life of a substrate and a release layer formed on the substrate surface may also be extended.

Polyimide Precursor

The polyimide precursor according to the present exemplary embodiment has a structure including the repeating unit represented by the following Formula (1).

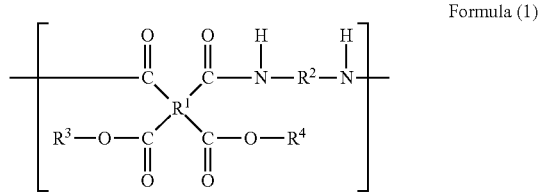

Formula (1)

In Formula (1), $R^1$ represents a tetravalent organic group, $R^2$ represents a divalent organic group. Each of $R^3$ and $R^4$ independently represents a monovalent organic group or hydrogen, and $R^3$ and $R^4$ are not hydrogen at the same time.

In Formula (1), the tetravalent organic group represented by $R^1$ is a residue obtained by removing four carbonyl groups from the tetracarboxylic dianhydride as a raw material. Specific examples of the corresponding tetracarboxylic acid include 3,3',4,4'-biphenyl tetracarboxylic acid, 2,3,3',4'-biphenyl tetracarboxylic acid, pyromellitic acid, 3,3',4,4'-diphenylether tetracarboxylic acid, and the like.

Among these, 3,3',4,4'-biphenyl tetracarboxylic acid is preferable.

In Formula (1), the divalent organic group represented by $R^2$ is a residue structure obtained by removing two amino groups from a diamine compound as a raw material. Specific examples of the corresponding diamine compound include 4,4'-diaminodiphenylether, 3,4'-diaminodiphenylether, p-phenylenediamine, m-phenylenediamine, and the like.

Among these, 4,4'-diaminodiphenylether and p-phenylenediamine are preferable.

A side chain structure of the polyimide precursor is a hemiacetal structure to which a vinyl ether compound corresponding to a carboxyl group has been added. The monovalent organic group represented by $R^3$ is a 1-alkoxyethyl group, and specific examples thereof include a 1-methyl alkoxyethyl group, a 1-ethyl alkoxyethyl group, a 1-propyl alkoxyethyl group, a 1-butyl alkoxyethyl group, a 1-pentyl alkoxyethyl group, and a 1-cyclohexyl alkoxyethyl group, and the like. Among these, a 1-methyl alkoxyethyl group, a 1-ethyl alkoxyethyl group, and a 1-cyclohexyl alkoxyethyl group are preferable.

Examples of the monovalent organic group represented by $R^4$ include the monovalent organic group represented by $R^3$ and hydrogen. Among these, a 1-methyl alkoxyethyl group, a 1-ethyl alkoxyethyl group, a 1-cyclohexyl alkoxyethyl group, and hydrogen are preferable.

The polyimide precursor according to the present exemplary embodiment has a structure formed by esterifying a carboxyl group of a polyamic acid structure, as shown in the Formula (1).

The proportion of the esterified polyamic acid structure in a polyamic acid-derived repeating unit in the polyamide precursor preferably ranges from 50 mol % to 100 mol %. When the proportion of the esterified polyamic acid structure is 50 mol % or more, a cohesive force of the polyimide precursor becomes weak, which makes it easy to dissolve the precursor in a ketone-based solvent, an ester-based solvent, an ether-based solvent, and a hydrocarbon-based solvent.

In the polyimide precursor according to the present exemplary embodiment, the repeating number of the repeating unit represented by the Formula (1) is preferably from 3 to 200 and more preferably from 25 to 150, from the viewpoints of handleability relating to the preparation of a molded product and the strength and durability of the obtained molded product.

The molecular weight of the polyimide precursor according to the present exemplary embodiment is preferably from 1,000 to 70,000 and more preferably from 10,000 to 50,000.

Esterification of the polyimide precursor according to the present exemplary embodiment is performed by allowing a vinyl ether compound to act on a carboxyl group of polyamic acid, as shown in the following Reaction Formula (1). In the following reaction formula, $R^x$ represents a monovalent organic group.

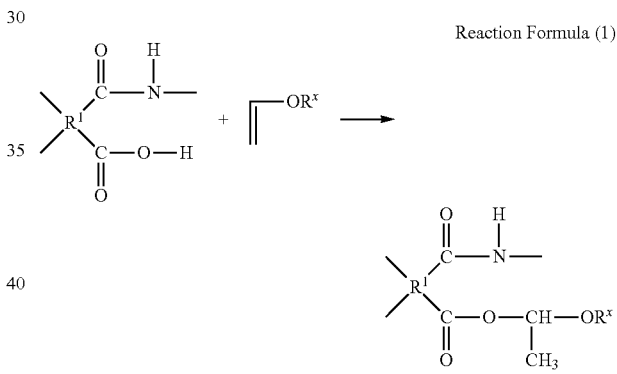

Reaction Formula (1)

It is not necessary to use a catalyst such as an acid or a base in the above reaction, and the reaction proceeds quantitatively at room temperature. The ester that is obtained by allowing a vinyl ether compound to act on a carboxyl group becomes a hemiacetal structure. A carboxylic acid structure of polyamic acid showing acidity is blocked by being hemiacetalized with a vinyl compound, whereby an electric repulsive force between the structure and acidic carbon black is reduced, and dispersion stability is improved. Due to the hemiacetalization, the force of interaction between polymer chains is reduced, so viscosity of a polyamic acid solution is decreased. Moreover, change in the viscosity of the solution over time is reduced, so stability of the solution as a coating solution is improved.

The hemiacetalized polyamic acid remains stable under heating at about 50° C. and is hardly dissociated in practice. On the other hand, if it is treated at a temperature equal to or higher than 60° C., vinyl ether is dissociated and turns into polyamic acid as shown in the following Reaction Formula (2), and then causes an imidization reaction, or the hemiacetalized polyamic acid directly causes dealcoholization, whereby the polyamic acid is converted into polyimide.

Reaction Formula (2)

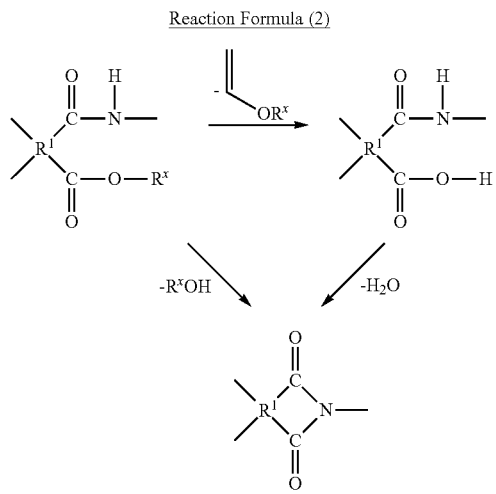

Solvent

The solvent included in the polyimide precursor composition according to the present exemplary embodiment simply needs to be able to dissolve the hemiacetalized polyamic acid. However, a hemiacetal compound obtained by reacting the polyamic acid according to the present exemplary embodiment with a vinyl ether compound is decomposed by a compound having a hydroxyl group structure, which leads to a possibility of deterioration of stability of the composition. In this respect, a solvent not having a hydroxyl group is more preferable than an alcohol-based solvent.

In addition, it is preferable to use a solvent having a boiling point of 150° C. or lower, in view of reducing processing energy in preparing a polyimide-molded product from the polyimide precursor composition according to the present exemplary embodiment. Moreover, if a general-purpose solvent that is widely used for industrial purposes such as use as a coating material is used, a cheap polyimide precursor composition is obtained.

When a polyimide-molded product is prepared from the polyimide precursor composition according to the present exemplary embodiment, if a solvent that does not easily remain in a film is used, strength, durability, and stability of the polyimide-molded product may be improved.

Specifically, a ketone-based solvent, an ether-based solvent, an ester-based (lactone-based) solvent, a hydrocarbon-based solvent, and a nitrogen atom-containing solvent are suitable.

As the ketone-based solvent, acetone, methyl ethyl ketone, methyl isobutyl ketone, DIBK (diisobutyl ketone), and cyclohexanone are suitably used.

Examples of the ether-based solvent include dioxane, tetrahydrofuran, and the like.

Examples of the ester-based solvent include ethyl acetate, methyl acetate, butyl acetate, methoxybutyl acetate, cellosolve acetate, amyl acetate, normal propyl acetate, isopropyl acetate, methyl lactate, ethyl lactate, butyl lactate, and the like. Examples of the lactone-based solvent include γ-butyrolactone, ε-caprolactone, and the like.

Examples of the hydrocarbon-based solvent include toluene, xylene, solvent naphtha, normal hexane, isohexane, cyclohexane, methyl cyclohexane, normal heptane, isooctane, normal decane, and the like.

Examples of the nitrogen atom-containing solvent include N-methyl-2-pyrrolidone (NMP), N-ethyl-2-pyrrolidone (NEP), N-vinylpyrrolidone, dimethyl acetamide (DMAc), 1,3-dimethyl-2-imidazolidinone (DMI), and the like.

Acidic Carbon Black Having pH of 5.0 or Less

The polyimide precursor composition according to the present exemplary embodiment includes acidic carbon black having a pH of 5.0 or less, as a conductive material.

Examples of the acidic carbon black having a pH of 5.0 or less include carbon black of which the surface has undergone oxidation treatment, such as carbon black obtained by imparting a carboxyl group, a quinone group, a lactone group, a hydroxyl group or the like to the surface thereof.

If the polyimide precursor composition according to the present exemplary embodiment is used to form, for example, an intermediate transfer belt in an electrophotographic image forming apparatus, carbon black having a pH of 4.5 or less is preferable, and acidic carbon black having a pH of 4.0 or less is more preferable, in view of stability of electric resistance over time and electric field dependency that inhibits electric field concentration caused by transfer voltage.

In the present exemplary embodiment, pH of the carbon black is a value measured by pH measurement method specified by JIS Z8802 (2011).

Examples of the acidic carbon black having a pH of 5.0 or less include, as commercially available examples, SPECIAL BLACK 4 (manufactured by Degussa, pH 4.0), "Printex 150T" (pH 4.5, a volatile content of 10.0%), "SPECIAL BLACK 350" (pH 3.5, a volatile content of 2.2%), "SPECIAL BLACK 100" (pH 3.3, a volatile content of 2.2%), "SPECIAL BLACK 250" (pH 3.1, a volatile content of 2.0%), "SPECIAL BLACK 5" (pH 3.0, a volatile content of 15.0%), "SPECIAL BLACK 4" (pH 3.0, a volatile content of 14.0%), "SPECIAL BLACK 4A" (pH 3.0, a volatile content 14.0%), "SPECIAL BLACK 550" (pH 2.8, a volatile content of 2.5%), "SPECIAL BLACK 6" (pH 2.5, a volatile content of 18.0%), "COLOR BLACK FW200" (pH 2.5, a volatile content of 20.0%), "COLOR BLACK FW2" (pH 2.5, a volatile content of 16.5%), and "COLOR BLACK FW2V" (pH 2.5, a volatile content of 16.5%) which are manufactured by Degussa, "MONARCH 1000" (pH 2.5, a volatile content of 9.5%), "MONARCH 1300" (pH 2.5, a volatile content of 9.5%), "MONARCH 1400" (pH 2.5, a volatile content of 9.0%), "MOGUL-L" (pH 2.5, a volatile content of 5.0%), and "REGAL 400R" (pH 4.0, a volatile content of 3.5%) which are manufactured by Cabot Corporation, and the like.

When the acidic carbon black having a pH of 5.0 or less has a particle shape, a primary particle size thereof is preferably less than 10 μm and more preferably 1 μm or less.

The content of the acidic carbon black having a pH of 5.0 or less depends on the use of the polyimide-molded product formed using the polyimide precursor composition according to the present exemplary embodiment. However, in view of moldability and exterior, mechanical, and electric qualities of the obtained molded product, the content is preferably from 1 part by weight to 40 parts by weight and more preferably from 10 parts by weight to 30 parts by weight, based on 100 parts by weight of the total resin components in the polyimide precursor composition according to the present exemplary embodiment.

Other Additives

The polyimide precursor composition according to the present exemplary embodiment may contain various fillers and the like, for the purpose of imparting various functions such as conductivity and a mechanical strength to a polyimide-molded product that is prepared using the composition. The composition may further contain a catalyst for accelerating an imidization reaction, a leveling material for improving the quality of a prepared film, and the like.

Examples of the conductive material (hereinbelow, described as "other conductive materials") other than the acidic carbon black having a pH of 5.0 or less, which is a material added to impart conductivity, include materials having conductivity (for example, volume resistivity of less than $10^7$ Ω·cm, applied hereinbelow in the same manner) or semiconductivity (for example, a volume resistivity of from $10^7$ Ω·cm to $10^{13}$ Ω·cm, applied hereinbelow in the same manner), and the materials are selected according to the usage purpose.

Examples of the conductive materials include carbon black having a pH exceeding 5.0 (for example, Ketjen black and acetylene black), metals (for example, aluminum, nickel, and the like), metal oxide (for example, yttrium oxide, tin oxide, and the like), ion conductive materials (for example, potassium titanate, LiCl, and the like), conductive polymers (for example, polyaniline, polypyrrole, polysulfone, polyacetylene, and the like), and so forth. In view of imparting electric durability, conductive polymers (for example, polyaniline and the like) are preferable.

Other conductive materials as above may be used alone or used in combination of two or more kinds thereof.

When other conductive materials have a particle shape, a primary particles size thereof is preferably less than 10 μm and more preferably 1 μm or less.

Examples of the filler added to improve a mechanical strength include particle-like materials such as silica powder, alumina powder, barium sulfate powder, titanium oxide powder, mica, and talc. In order to improve water repellency and a release property of the surface of a polyimide-molded product, fluororesin powder such as PTFE and PFA may be added.

As the catalyst for accelerating an imidization reaction, organic amine catalysts, dehydrating agents such as acid anhydride, phenol derivatives, and acid catalysts such as sulfonic acid derivatives and benzoic acid derivatives may be used.

For improving the quality of a film formed by the polyimide-molded product, a surfactant may be added, and as the surfactant, any of cationic, anionic, and nonionic surfactants may be used.

The content of other additives described above may be selected according to the usage purpose of the polyimide-molded product prepared.

Method of Preparing Polyimide Precursor Composition

The polyimide precursor composition according to the present exemplary embodiment is obtained by adding the carbon black having a pH of 5.0 or less to a solution that is obtained by dissolving the polyimide precursor formed by esterification of a carboxyl group of polyamic acid in a solvent.

For example, after a tetracarboxylic acid compound and a diamine compound are reacted in a solvent, or while these are being reacted, a polyamic acid precursor that is formed by esterifying a carboxyl group of the generated polyamic acid by using a vinyl ether compound or the like may be obtained, and the carbon black having a pH of 5.0 or less may be added. Specific examples of the method include a method of obtaining a solution of the polyimide precursor by any one of the following methods 1 to 4 and adding the carbon black having a pH of 5.0 or less to the solution, but the present invention is not limited to these methods.

Method 1

Tetracarboxylic dianhydride and a diamine compound are reacted in a solvent such as γ-BL (γ-butyrolactone) to generate polyamic acid, and then an esterification agent such as a vinyl ether compound is allowed to react, thereby generating a polyimide precursor. The generated polyimide precursor is taken out of the reaction solution and dissolved in a solvent, and acidic carbon black having a pH of 5.0 or less is added thereto, thereby obtaining the polyimide precursor composition according to the present exemplary embodiment.

Method 2

Tetracarboxylic dianhydride and a diamine compound are reacted in a solvent such as NMP to generate polyamic acid. Thereafter, the polyamic acid is taken out of the reaction solution and added to the solvent according to the present exemplary embodiment, and an esterification agent such as a vinyl ether compound is allowed to react, thereby generating and dissolving a polyimide precursor. Acidic carbon black having a pH of 5.0 or less is added thereto, thereby obtaining the polyimide precursor composition according to the present exemplary embodiment.

Method 3

Tetracarboxylic dianhydride and a diamine compound are reacted in a solvent according to the present exemplary embodiment to generate polyamic acid, and then an esterification agent such as a vinyl ether compound is allowed to react, thereby generating a polyimide precursor. Acidic carbon black having a pH of 5.0 or less is added thereto, thereby obtaining the polyimide precursor composition according to the present exemplary embodiment.

Method 4

Tetracarboxylic dianhydride and a diamine compound are added to a solvent according to the present exemplary embodiment. Thereafter, while an esterification agent such as a vinyl ether compound is being allowed to react, acidic carbon black having a pH of 5.0 or less is added thereto, thereby obtaining the polyimide precursor composition according to the present exemplary embodiment.

Among the above methods, methods 3 and 4 are suitable since it is not necessary to perform an operation to take out polyamic acid or a polyimide precursor in these methods. The method may be appropriately selected from the above methods in consideration of solubility of polyamic acid or a polyimide precursor used in a solvent and workability.

Polyamic Acid

The polyamic acid for obtaining the polyimide precursor according to the present exemplary embodiment preferably contains polyamic acid having at least an amino group on the terminal thereof, and more preferably, the polyamic acid has amino groups on all terminals.

In order to impart amino groups to both terminals of the polyimide precursor molecule, for example, a diamine compound used during a polymerization reaction is added in a molar equivalent higher than the molar equivalent of tetracarboxylic acid. The molar equivalent ratio between a diamine compound and tetracarboxylic acid preferably ranges from 1.0001 to 1.2 and more preferably ranges from 1.001 to 1.2, based on the molar equivalent of the tetracarboxylic acid that is set to 1.

If the molar equivalent ratio between a diamine compound and tetracarboxylic acid is 1.0001 or more, amino groups on the both terminals of the molecule exert a great effect, so excellent dispersibility is obtained. If the molar equivalent ratio is 1.2 or less, the molecular weight of the obtained polyamic acid is increased, so for example, a sufficient film strength (tear strength and tensile strength) is easily obtained when a film-like polyimide-molded product is formed.

A polyamic acid resin as a precursor of a polyimide resin is preferably obtained by causing a polymerization reaction between aromatic tetracarboxylic dianhydride and aromatic diamine.

Tetracarboxylic Dianhydride

The tetracarboxylic dianhydride usable in preparing polyamic acid is not particularly limited, and any of aromatic and aliphatic compounds may be used.

Examples of the aromatic tetracarboxylic dianhydride include pyromellitic dianhydride, 3,3',4,4'-benzophenone tetracarboxylic dianhydride, 3,3',4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furan tetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenyl propane dianhydride, 3,3',4,4'-perfluoroisopropylidene diphthalic dianhydride, 3,3',4,4'-biphenyl tetracarboxylic dianhydride, bis(phthalic)phenylphosphinoxide dianhydride, p-phenylene-bis(triphenylphthalic)dianhydride, m-phenylene-bis(triphenylphthalic)dianhydride, bis(triphenyl phthalic)-4,4'-diphenylether dianhydride, bis(triphenylphthalic)-4,4'-diphenylmethane dianhydride, and the like.

Examples of the aliphatic tetracarboxylic dianhydride include aliphatic or alicyclic tetracarboxylic dianhydrides such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 3,5,6-tricarboxynorbonane-2-acetic dianhydride, 2,3,4,5-tetrahydrofuran tetracarboxylic dianhydride, 5-(2,5-dioxotetrahydrofuryl)-3-methyl-3-cyclohexene-1,2-dicarboxylic dianhydride, and bicyclo[2,2,2]-octo-7-ene-2,3,5,6-tetracarboxylic dianhydride; aliphatic tetracarboxylic dianhydrides having an aromatic ring, such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione; and the like.

As the tetracarboxylic dianhydride, aromatic tetracarboxylic dianhydride is preferable, and pyromellitic dianhydride, 3,3',4,4'-benzophenone tetracarboxylic dianhydride, and 3,3',4,4'-biphenylsulfone tetracarboxylic dianhydride are suitably used.

These tetracarboxylic dianhydrides may be used alone or used in combination of two or more kinds thereof.

Diamine Compound

The diamine compound usable in preparing polyamic acid is not particularly limited as long as this compound is a diamine compound having two amino groups in the molecular structure.

Examples thereof include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring such as diaminotetraphenyl thiophene and hetero atoms other than nitrogen atoms of the amino groups; aliphatic and alicyclic diamines such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1,02.7]-undecylene dimethyldiamine, and 4,4'-methylenebis(cyclohexylamine); and the like.

As the diamine compound, p-phenylenediamine, 4,4'-diaminodiphenylmethane, 4,4'-diaminodiphenylether, 4,4'-diaminodiphenylsulfide, and 4,4'-diaminodiphenylsulfone are preferable.

These diamine compounds may be used alone or used in combination of two or more kinds thereof.

Combination of Tetracarboxylic Dianhydride and Diamine Compound

Polyamic acid is preferably synthesized using an aromatic tetracarboxylic dianhydride and an aromatic diamine.

Solvent Used in Polymerization Reaction of Polyamic Acid

The polyamic acid used for preparing the polyimide precursor composition according to the present exemplary embodiment is prepared by causing a polymerization reaction between a tetracarboxylic dianhydride and a diamine compound in a solvent. The solvent used for the polymerization reaction of polyamic acid is not particularly specified and not limited to the solvent included in the polyimide precursor composition according to the present exemplary embodiment. As the solvent used in the polymerization reaction of polyamic acid, a solvent that can dissolve a tetracarboxylic dianhydride and a diamine compound as raw materials is used. Specifically, the following solvents are used.

Examples of the solvents include sulfoxide-based solvents such as dimethyl sulfoxide and diethyl sulfoxide, formamide-based solvents such as N,N-dimethylformamide and N,N-diethylformamide, acetamide-based solvents such as N,N-dimethylacetamide and N,N-diethylacetamide, pyrrolidone-based solvents such as N-methyl-2-pyrrolidone and N-vinyl-2-pyrrolidone, phenol-based solvents such as phenol, o-, m-, or p-cresol, xylenol, halogenated phenol, and catechol, ether-based solvents such as tetrahydrofuran, dioxane, and dioxolane, alcohol-based solvents such as methanol, ethanol, and butanol, cellosolve-based solvents such as butyl cellosolve, hexamethylphosphoramide, γ-butyrolactone, and the like. These are preferably used alone or used as a mixture, and in addition, aromatic hydrocarbon such as xylene and toluene may be used. The solvent is not particularly limited as long as it dissolves polyamic acid.

Vinyl Ether Compound

Examples of the vinyl ether compound for esterifying a carboxyl group of polyamic acid include the following compounds.

Specific examples of primary vinyl ether compounds include vinyl ether compounds having a linear or branched saturated or unsaturated hydrocarbon skeleton, such as methyl vinyl ether, ethyl vinyl ether, n-propyl vinyl ether, n-butyl vinyl ether, n-amyl vinyl ether, and octyadecyl vinyl ether; vinyl ether compounds having an alicyclic saturated hydrocarbon skeleton, such as cyclohexyl methyl vinyl ether, tricyclodecanyl methyl vinyl ether, and pentacyclopentadecanyl methyl vinyl ether; vinyl ethers having an ether bond in a linear or branched saturated or unsaturated hydrocarbon skeleton, such as ethylene glycol methyl vinyl ether, ethylene glycol ethyl vinyl ether, ethylene glycol propyl vinyl ether, ethylene glycol butyl vinyl ether, polyethylene glycol methyl vinyl ether, polyethylene glycol ethyl vinyl ether, polyethylene glycol propyl vinyl ether, polyethylene glycol butyl vinyl ether, polyethylene glycol octyl vinyl ether, propylene glycol methyl vinyl ether, propylene glycol ethyl vinyl ether, propylene glycol propyl vinyl ether, propylene glycol butyl vinyl ether, polypropylene glycol methyl vinyl ether, polypropylene glycol ethyl vinyl ether, polypropylene glycol propyl vinyl ether, polypropylene glycol butyl vinyl ether, polypropylene glycol octyl vinyl ether, butylene glycol methyl vinyl ether, butylene glycol ethyl vinyl ether, butylene glycol propyl vinyl ether, butylene glycol butyl vinyl ether, polybutylene glycol methyl vinyl ether, polybutylene glycol ethyl vinyl ether, polybutylene glycol propyl vinyl ether, polybutylene glycol butyl vinyl ether, polybutylene glycol octyl vinyl ether, and 2-hydroxytetrahydropyran; and the like. The examples further include cyclic vinyl ether compounds such as 3,4-dihydro-2H-pyran.

Specific examples of secondary vinyl ether compounds include vinyl ether compounds having a linear or branched saturated or unsaturated hydrocarbon skeleton, such as isopropyl vinyl ether, sec-butyl vinyl ether, and sec-pentyl vinyl ether; vinyl ether compounds having an alicyclic saturated hydrocarbon skeleton, such as cyclohexyl vinyl ether, tricyclodecanyl vinyl ether, and pentacyclopentadecanyl vinyl ether; vinyl ethers having an ether bond in a linear or branched saturated or unsaturated hydrocarbon skeleton, such as 1-methoxyethyl vinyl ether, 1-ethoxyethyl vinyl ether, 1-methyl-2-methoxyethyl vinyl ether, and 1-methyl-2-ethoxyethyl vinyl ether; and the like.

Specific examples of tertiary vinyl ether compounds include vinyl ether compounds having a linear or branched saturated or unsaturated hydrocarbon skeleton, such as tert-butyl vinyl ether and test-amyl vinyl ether; vinyl ether compounds having an alicyclic saturated hydrocarbon skeleton, such as 1-methylcyclohexyl vinyl ether and 1-adamantyl vinyl ether; vinyl ethers having an ether bond in a linear or branched saturated or unsaturated hydrocarbon skeleton, such as 1,1-dimethyl-2-methoxyethyl vinyl ether; and the like.

Vinyl Ether Compound in Polyimide Precursor Composition

The polyimide precursor composition according to the present exemplary embodiment may further include a vinyl ether compound. This vinyl ether compound may be included as a residue of the vinyl ether compound that is used as an esterification agent for esterifying a carboxyl group of polyamic acid for obtaining the polyimide precursor including the repeating unit represented by Formula (1) Alternatively, after the polyimide precursor is synthesized from the polyamic acid and the vinyl ether compound, a vinyl ether compound which is the same type as or different type from the vinyl ether compound used as an esterification agent may be added.

If the polyimide precursor composition according to the present exemplary embodiment includes a vinyl ether compound, an effect of improving a mechanical strength of the polyimide-molded product and decreasing a coefficient of thermal linear expansion is obtained. Presumably, the reason is that during the formation of a polyimide-molded product, since a polyimide precursor once passes through an adduct of the vinyl ether compound included in the polyimide precursor composition, imidization proceeds while the arrangement of polymer main chains is being organized, and accordingly, denseness of a polyimide film is improved.

By the types of the vinyl ether compound added later, quality such as surface roughness or a mechanical strength of a polyimide-molded product is adjusted. For example, as a vinyl ether compound A that is used as an esterification agent in synthesizing the polyimide precursor, a compound that is easily removed during imidization may be used, and imidization may be caused through a reaction (ester exchange reaction) for replacing an ester group derived from the vinyl ether compound A with a vinyl ether compound B to be added later, whereby denseness of a film may be controlled.

The content of the vinyl ether compound in the polyimide precursor composition is preferably from 5% by weight to 50% by weight, based on the corresponding polyamic acid.

Method of Preparing Polyimide-Molded Product

The polyimide precursor composition according to the present exemplary embodiment is coated onto a material to be coated so as to form a coating film, and heating treatment is performed on the coating film, thereby obtaining a polyimide-molded product.

The polyimide-molded product prepared using the polyimide precursor composition is not particularly limited. Hereinbelow, as an example of the method of preparing a polyimide-molded product by using the polyimide precursor composition according to the present exemplary embodiment, a method of preparing an endless belt will be described in detail.

The method of preparing a polyimide-molded product by using the polyimide precursor composition according to the present exemplary embodiment includes a step of forming a coating film by coating the polyimide precursor composition according to the present exemplary embodiment onto a material to be coated, a step of forming an endless belt by performing heating treatment on the coating film formed on the material to be coated, and a step of detaching the endless belt from the material to be coated.

First, the polyimide precursor composition according to the present exemplary embodiment is coated to the inner or outer surface of a mold. As the mold, for example, a cylindrical metal mold is suitably used. Instead of the metal mold, molding tools made of other materials such as a resin, glass, and ceramic may be used. The surface of the molding tool may be coated with glass or ceramic, or a silicone- or fluorine-based release agent may be used.

Next, the cylindrical metal mold coated with the polyimide precursor composition is heated or placed in a vacuum environment for drying, whereby 30% by weight or more, preferably 50% by weight or more of the solvent contained is volatilized. By this drying treatment, the polyimide precursor is decomposed into polyamic acid and a vinyl ether compound. By controlling the temperature and time of the heating treatment, the generated vinyl ether compound is volatilized and removed.

The cylindrical metal mold is heated to a temperature from 200° C. to 450° C. so as to cause an imide conversion reaction. The temperature of imidization varies with, for example, types of the tetracarboxylic dianhydride and diamine used as raw materials. If the degree of imidization is insufficient, mechanical and electric characteristics deteriorate, so the temperature is set such that the imidization is completed.

Thereafter, a cylindrical film formed on the surface of the cylindrical metal mold is detached from the mold, thereby obtaining an endless belt.

Examples of Use of Polyimide-Molded Product

The polyimide-molded product according to the present exemplary embodiment is a polyimide-molded product formed by performing heating treatment on a coating film that is formed by coating the above-described polyimide precursor composition according to the present exemplary embodiment onto a material to be coated. The polyimide-molded product is suitably used for, for example, an intermediate transfer member (intermediate transfer belt), a transfer belt, a fixing belt, a transport belt, and the like in an electrophotographic image forming apparatus.

When the polyimide-molded product according to the present exemplary embodiment is used as an intermediate transfer belt, a surface resistivity of the outer circumferential surface thereof is preferably from 8 (Log Ω/square) to 13 (Log Ω/square) and more preferably from 8 (Log Ω/square) to 12 (Log Ω/square), in terms of the value of common logarithm. If the value of common logarithm of the surface resistivity exceeds 13 (Log Ω/square), a recording medium is electrostatically adsorbed onto the intermediate transfer member during secondary transfer, which makes it difficult to peel off the recording medium in some cases. On the other hand, if the value of common logarithm of the surface resistivity is less than 8 (Log Ω/square), a toner image primary-transferred to the intermediate transfer member is held with an insufficient force, which causes granularity in image quality or image disarray in some cases.

The value of common logarithm of the surface resistivity is controlled by the types of conductive materials and the amount of the conductive material added. The surface resistivity is measured by the method described later in examples.

When the polyimide-molded product according to the present exemplary embodiment is applied to an intermediate transfer member (intermediate transfer belt), the overall volume resistivity thereof is preferably from 8 (Log Ωcm) to 13 (Log Ωcm), in terms of the value of common logarithm. If the value of common logarithm of the volume resistivity is less than 8 (Log Ωcm), the action of the electrostatic force that holds charge of the unfixed image transferred to the intermediate transfer member from an image holding member becomes less effective. Accordingly, due to an electrostatic repulsive force between toner particles and a force of fringing field of the edge of an image, toner is scattered around the image, so an image with large noise is formed in some cases. On the other hand, if the value of common logarithm of the volume resistivity exceeds 13 (Log Ωcm), the charge-holding force becomes large, so an erasing mechanism is required in some cases since the surface of the intermediate transfer member is charged in the transfer field during primary transfer.

The value of common logarithm of the volume resistivity is controlled by the types of conductive materials and the amount of the conductive material added. The volume resistivity is measured by the method described later in examples.

Image Forming Apparatus

The image forming apparatus according to the present exemplary embodiment is constituted with the endless belt prepared from the polyimide precursor composition according to the present exemplary embodiment. For example, the image forming apparatus according to the present exemplary embodiment includes the endless belt according to the exemplary embodiment, as a member for an image forming apparatus, such as an intermediate transfer member (intermediate transfer belt), a recording medium transport and transfer member (recording medium transport belt), a recording medium transport member (recording medium transport belt), or a fixing member (fixing belt: heating belt or pressurizing belt).

Examples of the image forming apparatus according to the present exemplary embodiment include electrophotographic image forming apparatuses such as an electrophotographic copying machine, a laser beam printer, a facsimile, and a composite apparatus thereof. Specific examples thereof include a general mono-color image forming apparatus that accommodates a monochromatic toner in a developing device, a color image forming apparatus that repeatedly transfers toner images held on an image holding member to an intermediate transfer member by sequential primary transfer, and a tandem type color image forming apparatus in which plural image holding members including developing devices for each color are arranged in tandem on an intermediate transfer member.

Examples of the specific configuration of the image forming apparatus of the present exemplary embodiment include a configuration that includes an image holding member, a charging unit that charges a surface of the image holding member, an electrostatic latent image-forming unit that forms an electrostatic latent image on a charged surface of the image holding member, a developing unit that forms a toner image by developing the electrostatic latent image formed on the surface of the image holding member by using a toner, an intermediate transfer member that includes a polyimide-molded product formed from the polyimide precursor composition according to the present exemplary embodiment as an endless belt, a primary transfer unit that transfers the toner image formed on a surface of the image holding member to the intermediate transfer member, and a secondary transfer device that transfers the toner image on the intermediate transfer member to a recording medium. The configuration may further include other known units such as a fixing unit that fixes the toner image transferred to the surface of the recording medium.

Hereinbelow, a specific example of the image forming apparatus of the present exemplary embodiment will be described in detail by using drawings.

In the following specific example, a unit including a pair of fixing rolls is used as a fixing unit. However, at least one of the fixing rolls may be replaced with a fixing belt, and the endless belt according to the present exemplary embodiment may be provided as the fixing belt.

FIG. 1 is a schematic configuration view showing an example of the image forming apparatus according to the present exemplary embodiment. The image forming apparatus uses the endless belt according to the present exemplary embodiment as an intermediate transfer member (intermediate transfer belt).

An image forming apparatus 100 shown in FIG. 1 includes photoreceptors (an example of an image holding member) 101Y, 101M, 101C, and 101BK. When the photoreceptors rotate in the direction of an arrow A, an electrostatic latent image corresponding to image information is formed on the surface thereof by a known electrophotographic process (not shown in the drawing) (a charging device, an exposure device, a cleaning device, and the like are not shown in FIG. 1).

Around the photoreceptors 101Y, 101M, 101C, and 101BK, developing devices 105, 106, 107, and 108 corresponding to the respective colors including yellow (Y), magenta (M), cyan (C), and black (BK) are arranged respectively. The electrostatic latent images formed on the photoreceptors 101Y, 101M, 101C, and 101BK are developed by the respective developing devices 105, 106, 107, and 108, thereby forming toner images.

Accordingly, for example, the electrostatic latent image written in the photoreceptor 101Y corresponds to the information of a yellow image, and this electrostatic latent image is developed by the developing device 105 containing a yellow (Y) toner, thereby forming a yellow toner image on the photoreceptor 101Y.

An intermediate transfer belt 102 is a belt-like intermediate transfer belt that is disposed so as to contact the surface of the photoreceptors 101Y, 101M, 101C, and 101BK. This belt rotates in the direction of an arrow B while receiving tension by a backside roll 117 and supporting rolls 118 and 119.

In the respective positions of primary transfer where the photoreceptors 101Y, 101M, 101C, and 101BK contact the intermediate transfer belt 102, the unfixed toner images formed on the photoreceptors 101Y, 101M, 101C, and 1018K are sequentially transferred from the photoreceptors 101Y, 101M, 101C, and 1018K to the surface of the intermediate transfer belt 102 such that the toner images of the respective colors are superimposed on top of each other.

At the position of primary transfer, in the back surface of the intermediate transfer belt 102, corona dischargers are arranged as primary transfer devices 109, 110, 111, and 112 that prevent the contact area from being charged before transfer by using shielding members 121, 122, 123, and 124 for inhibiting transfer field from acting on an unnecessary area in the intermediate transfer belt 102. When the charging devices 109, 110, 111, and 112 are applied with voltage having a polarity opposite to the charged polarity of the toner, the unfixed toner images on the photoreceptors 101Y, 101M, 101C, and 1018K are eletrostatically transferred to the outer circumferential surface of the intermediate transfer belt 102. If the primary transfer devices 109, 110, 111, and 112 use an electrostatic force, the invention is not limited to the corona discharger, and a roll or brush applied with voltage may also be used.

As the intermediate transfer belt 102 rotates, the unfixed toner image primary-transferred to the intermediate transfer belt 102 in the above manner is transported to a position of secondary transfer facing the transport path of a recording medium 103. In the position of secondary transfer, a secondary transfer roll 120 and a backside roll 117 which contacts the back surface of the intermediate transfer belt 102 are arranged while interposing the intermediate transfer belt 102 therebetween.

The recording medium 103 discharged from a paper feeding portion 113 by a feeding roll 126 is inserted into the portion where the secondary transfer roll 120 contacts the intermediate transfer belt 102. At this time, voltage is applied to the portion where the secondary transfer roll 120 contacts the backside roll 117, and the unfixed toner image held on the intermediate transfer belt 102 is transferred to the recording medium 103 in the portion of secondary transfer.

Subsequently, the recording medium 103 to which the unfixed toner image has been transferred is peeled from the intermediate transfer belt 102, and by a transport belt 115, the unfixed toner image is sent into the contact portion between a heating roll 127 and a pressurizing roll 128 of a fixing device in which the heating roll 127 and the pressurizing roll 128 are arranged while facing each other, whereby fixing treatment is performed on the unfixed toner image. At this time, the image forming apparatus may be constituted such that a step of performing transfer and fixing simultaneously in which the step of secondary transfer and the step of fixing are performed simultaneously is performed.

The intermediate transfer belt 102 includes a cleaning device 116. The cleaning device 116 is disposed so as to freely contact and separate from the intermediate transfer belt 102, and is separated from the intermediate transfer belt 102 until the secondary transfer is performed.

As the recording medium, a sheet-like member constituted with a material having relatively high flexibility, such as a recording medium (so-called paper sheet) made of paper or a recording medium (so-called OHP sheet) constituted with a plastic film, is used. A plate-like member (for example, a thick plastic card or the like) constituted with a material having relatively high rigidity may also be used as the recording medium.

So far, the image forming apparatus that includes, as an intermediate transfer member, an endless belt molded using the polyimide precursor composition according to the present exemplary embodiment has been specifically described. However, as the image forming apparatus according to the present exemplary embodiment, a configuration is exemplified which includes a transfer unit that has a recording medium transport and transfer member (recording medium transport and transfer belt) for transporting a recording medium and a transfer unit for transferring a toner image formed on an image holding member to the recording medium transported by the recording medium transport and transfer member, and includes the endless belt according to the present exemplary embodiment as the recording medium transfer member.

As the image forming apparatus according to the present exemplary embodiment, a configuration is also exemplified which includes, as a fixing unit, at least a pair of fixing members arranged while facing each other so as to be pressed on each other, and includes, as at least one of the fixing members (fixing belt: heating belt or pressurizing belt), the endless belt according to the present exemplary embodiment.

As the image forming apparatus according to the present exemplary embodiment, a configuration is also exemplified which includes a recording medium transport member that is disposed in the path in which a recording medium is transported outside the apparatus from a recording medium storage container through an image forming portion, and includes, as the recording medium transport member, the endless belt according to the present exemplary embodiment.

For the image forming apparatus according to the present exemplary embodiment, an electrophotographic image forming apparatus has been described. However, the present invention is not limited thereto, and the apparatus may be a known image forming apparatus (for example, an ink jet recording apparatus including an endless belt for transporting paper) employing known methods other than electrophotography.

The use of the polyimide-molded product according to the present exemplary embodiment is not limited to the above belt members of the image forming apparatus, and the polyimide-molded product is usable for, for example, a driving belt, a laminate belt, an electric insulating material, a pipe coating material, an electromagnetic wave-insulating material, a heat source-insulating material, an electromagnetic wave-absorbing film, a flexible substrate, a material for black matrix of liquid crystal display, a light shielding film, and the like.

EXAMPLES

Examples will be described below, but the present invention is not limited to the examples. In the following description, both the "part (s)" and "%" are based on weight, unless otherwise specified.

Example 1

Preparation of Polyimide Precursor Composition A1

450 g of N-methyl-2-pyrrolidone (hereinbelow, described as "NMP") is injected into a flask provided with a stirring rod, a thermometer, and a dropping funnel, while dried nitrogen gas is being passed into the flask. After the solution temperature is increased to 30° C. by heating, 41.23 g (205.92 mmol) of 4,4'-diaminodiphenylether (hereinbelow, described as "ODA"; molecular weight 200.24) is added thereto and dissolved. After the dissolution is confirmed, 58.77 g (199.75 mmol) of 3,3',4,4'-biphenyltetracarboxylic dianhydride (hereinbelow, described as "BPDA"; molecular weight 294.22) is added thereto while the solution temperature is being held at 30° C., followed by stirring and dissolution.

After dissolution of the tetracarboxylic dianhydride is confirmed, stirring is continued while the temperature is being held at 30° C., thereby causing a polymerization reaction of polyamic acid. After 24 hours of the reaction, viscosity of the polyamic acid solution is measured by the following method, which is measured to be 7.0 Pas.

Viscosity Measurement Method

Viscosity is measured using an E type viscometer under the following conditions.

Measurement device: E type rotational viscometer TV-20H (manufactured by TOKI SANGYO CO., LTD.)

Measurement probe: No. 3 type rotor 3°×R14

Measurement temperature: 22° C.

The polyamic acid solution is added to methanol to precipitate a polyamic acid resin. The precipitated polyamic acid resin is dried at 30° C. and 10 mmHg (1.3 kPa) for 24 hours.

50.00 g of the dried polyamic acid resin is added to 450 g of methyl ethyl ketone (hereinbelow, described as "MEK") kept at 30° C., and 40.02 g (399.5 mmol; blocking rate 1.00) of n-butyl vinyl ether (hereinbelow, described as "NBVE"; molecular weight 100.16) is added dropwise thereto. As the reaction proceeds, the resin dissolves and becomes a solution. The reaction is performed at 30° C. for an hour, thereby obtaining a polyimide precursor solution. Viscosity of the solution is measured to be 500 mPas.

Thereafter, 15.0 g (30 parts based on 100 parts of the polyamic acid resin) of SPECIAL BLACK 4 (manufactured by Degussa, pH 4.0, a volatile content of 14.0%; hereinbelow, abbreviated to "CB" in some cases) which is carbon black having undergone oxidation treatment is added to the polyimide precursor solution as a dried conductive material and the resultant is treated with a ball mill for 6 hours, thereby dispersing the carbon black. In this manner, a polyimide precursor composition A1 is obtained.

The obtained polyimide precursor composition A1 is tested as follows to evaluate its characteristics.

Film Formation Test

A silicone-based release agent (manufactured by Shin-Etsu Chemical Co., Ltd., product name: KS-700) is coated to the outer surface of a cylindrical stainless steel mold having an outer diameter of 90 mm and a length of 450 mm, followed by drying treatment (release agent treatment).

While the cylindrical mold having undergone the release agent treatment is being rotated at a speed of 10 rpm in the circumferential direction, the polyimide precursor composition A1 as a coating solution is discharged from the end of the cylindrical mold by using a dispenser having a bore of 1.0 mm and pressed on the mold with a constant pressure by a metal blade installed on the mold, thereby performing coating. Specifically, the dispenser unit is moved in the axis direction of the cylindrical mold at a rate of 100 mm/min, thereby coating the coating solution in a spiral shape onto the cylindrical mold. The blade is removed after coating, and the cylindrical mold is kept rotating for 2 minutes, thereby performing leveling.

Thereafter, while the mold and the coated substance are being rotated in a drying furnace at 150° C. and 10 rpm under air atmosphere, drying treatment is performed for 30 minutes. A solvent is volatilized from the coated substance in the drying treatment, thereby obtaining a polyamic acid resin-molded product (body of an endless belt) having a self-supporting property from the coated substance.

Subsequently, baking treatment is performed in a clean oven at 300° C. for 30 minutes, thereby distilling the solvent away and completing an imidization reaction.

Thereafter, the temperature of the cylindrical mold is decreased to 25° C., and the resin is detached from the cylindrical mold, thereby obtaining a cylindrical polyimide-molded product.

Film Formability

The obtained cylindrical polyimide-molded product is observed in terms of the following viewpoints, thereby evaluating properties of the formed film.

Voids

Evaluation is performed regarding whether there is a trace of voids on the surface of the cylindrical polyimide-molded product.

A: A trace of voids is not observed.

B: 1 or more and less than 10 traces of voids are confirmed on the surface of the molded product.

C: There are 10 or more and less than 50 traces of voids on the surface of the molded product.

D: Numerous traces of voids are evenly caused on the surface of the molded product.

Surface Unevenness and Pattern

Evaluation is performed regarding whether surface unevenness and patterns are caused on the surface of the cylindrical molded product.

A: Surface unevenness and patterns are not observed.

B: Surface unevenness and patterns are confirmed to a slight extent on a portion of the surface of the molded product (less than 10% of the surface area of the molded product).

C: Surface unevenness and patterns are confirmed on a portion of the surface of the molded product (10% or more of the surface area of the molded product).

D: Surface unevenness and patterns are evenly caused on the surface of the molded product.

Tensile Strength and Elongation

From the prepared polyimide-molded product, a test piece is molded by punching by using a No. 3 dumbbell. The test piece is installed in a tensile tester, and the applied load at which the test piece is broken by a tensile strength and elongation at break are measured under the following conditions. A breaking strength is measured based on the film thickness measured previously.

Measurement device: A tensile tester 1605 model manufactured by AIKOH ENGINEERING CO., LTD.

Sample length: 30 mm

Sample width: 5 mm

Pulling rate: 10 mm/min

Threshold number of times of folding

Folding resistance: MIT test

A 150 mm×15 mm test piece is prepared from the obtained endless belt.

Based on JIS-05016, the number of times of reciprocating bending at which the test piece is broken is measured. The measurement is performed 10 times on the same test piece, and the average thereof is taken as evaluation results of folding resistance and measurement data. As a measurement instrument, MIT type folding endurance tester MIT-DA manufactured by Toyo Seiki Seisaku-Sho, Ltd. is used.

Surface Resistance Characteristics

Surface resistance characteristics are measured using a circular electrode ("UR Probe" of Highrester IP manufactured by Mitsubishi Petrochemical Co., Ltd.), according to JIS K6911.

Figure 2A:
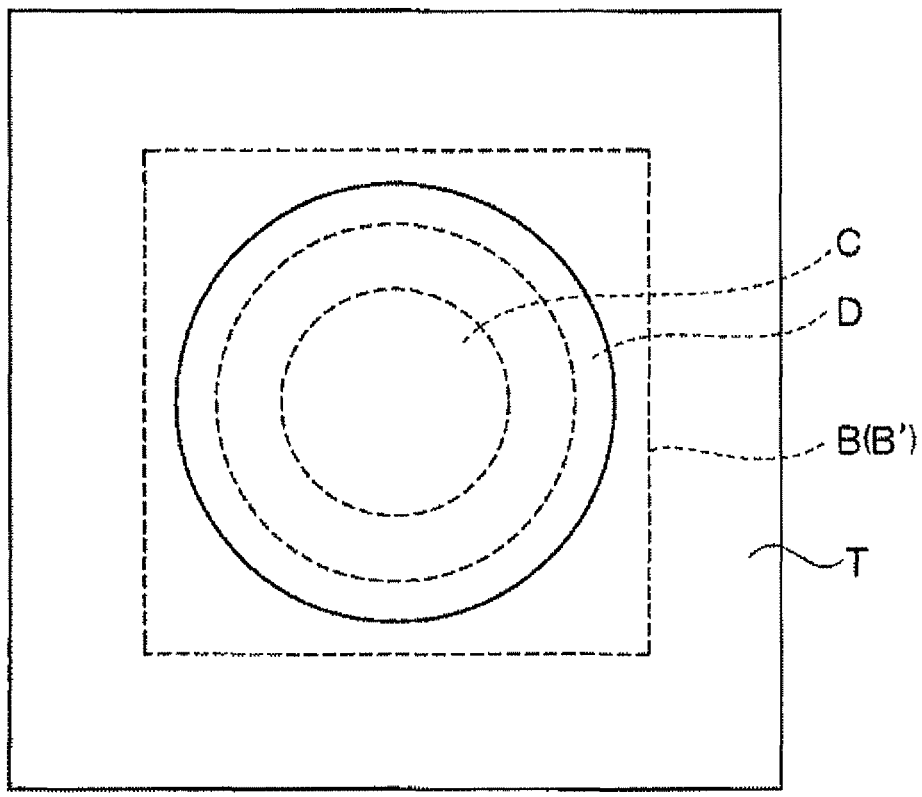
FIGS. 2A and 2B are respectively a schematic plan view and a schematic cross-sectional view showing an example of a circular electrode.
Figure 2B:
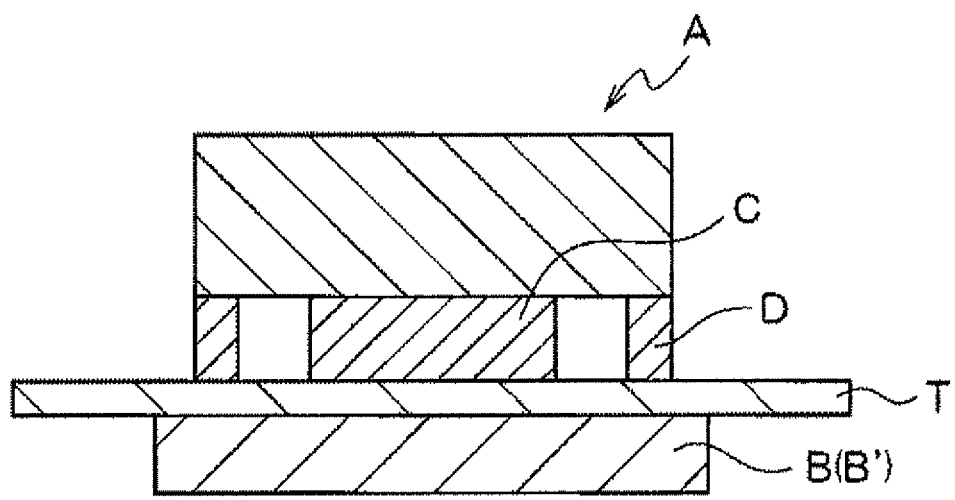

The method of measuring surface resistivity will be described using FIG. 2. FIGS. 2A and 2B are a schematic plan view and a schematic cross-sectional view respectively showing an example of a circular electrode. The circular electrode shown in FIG. 2 includes a first voltage-applied electrode A and a plate-like insulator B. The first voltage-applied electrode A includes a cylindrical electrode portion C and a ring-like electrode portion D having a shape of a cylinder which has an internal diameter larger than the outer diameter of the cylindrical electrode portion C and surrounds the cylindrical electrode portion C with a certain space therebetween.

A belt T is interposed between the cylindrical electrode portion C as well as the ring-like electrode portion D in the first voltage-applied electrode A and the plate-like insulator B, and a voltage V (V) is applied between the cylindrical electrode portion C and the ring-like electrode portion D in the first voltage-applied electrode A. A current I (A) flowing at this time is measured, and by the following formula, a surface resistivity ρs (Ω/square) of the transfer surface of the belt T is calculated. In the following formula, d (mm) represents the outer diameter of the cylindrical electrode portion C and D (mm) represents the inner diameter of the ring-like electrode portion D.

$$\rho s = \pi \times (D+d)/(D-d) \times (V/I) \quad \text{Formula:}$$

The surface resistivity is calculated by measuring a current value that is obtained after a voltage of 500 V is applied for 10 seconds under an environment of 22° C. and 55% RH, by using a circular electrode ("UR Probe" of Highrester IP manufactured by Mitsubishi Petrochemical Co., Ltd.: an outer diameter φ of the cylindrical electrode portion C of 16 mm, an inner diameter φ and an outer diameter φ of the ring-like electrode portion D of 30 mm and 40 mm respectively).

Volume Resistance Characteristics

Volume resistivity is measured using a circular electrode ("UR Probe" of Highrester IP manufactured by Mitsubishi Petrochemical Co., Ltd.), according to JIS K6911. The method of measuring volume resistivity will be described using FIG. 2. For this measurement, the same instrument as in the surface resistivity measurement is used. Here, the circular electrode shown in FIG. 2 includes a second voltage-applied electrode B' instead of the plate-like insulator B at the time of surface resistivity measurement. The belt T is interposed between the cylindrical electrode portion C as well as the ring-like electrode portion D in the first voltage-applied electrode A and the second voltage-applied electrode B', and the voltage V (V) is applied between the cylindrical electrode portion C in the first voltage-applied electrode A and the second voltage applied electrode B'. The current I (A) flowing at this time is measured, and by the following formula, a volume resistivity ρv (Ωm) of the belt T is calculated. In the following formula, t represent a thickness of the belt T.

$$\rho v = 19.6 \times (V/I) \times t \quad \text{Formula}$$

The volume resistivity is calculated by measuring a current value that is obtained after a voltage of 500 V is applied for 10 seconds under an environment of 22° C. and 55% RH, by using a circular electrode ("UR Probe" of Highrester IP manufactured by Mitsubishi Petrochemical Co., Ltd.: an outer diameter φ of the cylindrical electrode portion C of 16 mm, an inner diameter φ and an outer diameter φ of the ring-like electrode portion D of 30 mm and 40 mm respectively).

In the above formula, "19.6" is an electrode coefficient for converting a value into resistivity, and is calculated by $\pi d^2/4t$ from the outer diameter d (mm) of the cylindrical electrode portion and a thickness t (cm) of a sample. The thickness of the belt T is measured using an eddy-current film thickness meter CTR-1500E (manufactured by Sanko electronic laboratory Co., Ltd.).

Quality of Output Image

The endless belt obtained as above is mounted on an ApeosPort-III C4400-modified machine (modified to have a process rate of 250 mm/sec and a primary transfer current of 35 μA) manufactured by Fuji Xerox Co., Ltd., as an intermediate transfer belt. At a low temperature and low humidity (10° C. and 15% RH), 5000 sheets of 50% halftone images of cyan and magenta are output on C2 paper manufactured by Fuji Xerox Co., Ltd, and the quality of the output image of the 5000$^{th}$ sheet is visually evaluated in terms of density unevenness and spot defect. The respective evaluation criteria are as follows.

Density Unevenness

A: Density unevenness is not confirmed.

B: Though density unevenness is slightly confirmed, this is at an unproblematic level.

D: Density unevenness is clearly confirmed.

Spot Defects

A: Spot defects are not confirmed.

B: Though spot defects are confirmed to a slight extent, this is at an unproblematic level.

D: Spot defects are clearly confirmed.

The composition of the obtained polyimide precursor composition and the evaluation results of the characteristics of the polyimide-molded product obtained from the polyimide precursor composition are shown in Table 1.

Examples 2 and 3

Preparation of Polyimide Precursor Compositions A2 and A3

Polyimide precursor compositions A2 and A3 are prepared in the same manner as in Example 1, except that the amount of NEVE added is changed as shown in Table 1. According to the manner in Example 1, polyimide-molded products are prepared, and their characteristics are evaluated. The results are shown in Table 1.

Examples 4 to 9

Preparation of Polyimide Precursor Compositions B1 to H1

Polyimide precursor compositions B1 to H1 are prepared in the same manner as in Example 1, except that the solvent is changed to the chemical species shown in Table 1. According to the manner in Example 1, polyimide-molded products are prepared, and their characteristics are evaluated. The results are shown in Table 1.

Examples 10 to 13

Preparation of Polyimide Precursor Compositions I1 to L1

Polyimide precursor compositions I1 to L1 are prepared in the same manner as in Example 1, except that the solvent is changed to BL and the vinyl ether compound is changed to the chemical species shown in Table 1. According to the manner in Example 1, polyimide-molded products are prepared, and their characteristics are evaluated. The results are shown in Table 1.

Example 14

A polyimide-molded product is prepared according to the manner in Examples 1, except that the carbon black is changed to "Printex 150T" (pH 4.5, a volatile content of 10.0%) manufactured by Degussa, and its characteristics are evaluated. The results are shown in Table 1.

Example 15

Preparation of Polyimide Precursor Composition N1

Polyamic acid is polymerized according to Example 1, except that in the polymerization composition of the polyamic acid in Example 1, the amount of ODA is changed to 40.00 g (199.75 mmol) and the amount of BPDA is changed to 60.59 g (205.92 mmol). Viscosity of the polyamic acid solution becomes 7.0 Pas.

Thereafter, a vinyl ether compound is allowed to react in the same manner as in Example 1, and at this time, viscosity of the obtained polyimide precursor solution is 500 meas.

In addition, a polyimide-molded product is prepared according to the manner in Example 1, and its characteristics are evaluated. The results are shown in Table 1.

Example 16

Preparation of Polyimide Precursor Composition O1

Polyamic acid having an acid anhydride terminal is obtained in the same manner as in Example 1, except that the amount of ODA in Example 1 is changed to 40.00 g (199.75 mmol) and the amount of BPDA is changed to 60.59 g (205.92 mmol). The obtained polyamic acid is precipitated, and then a polyimide precursor composition O1 is prepared using a BL solvent. A polyimide-molded product is prepared according to the manner in Example 1, and its characteristics are evaluated. The results are shown in Table 1.

Comparative Example 1

Preparation of Polyimide Precursor Composition X-1

A treatment is performed in the same manner as in Example 1, except that NEVE is not added. A polyamic acid resin that is polymerized in NMP and precipitated using methanol is not dissolved in MEK.

Comparative Example 2

Preparation of Polyimide Precursor Composition X-2

NMP is further added to a polyamic acid-NMP solution prepared in the same manner as in Example 1, thereby preparing a polyimide precursor composition X-2 containing a 10% solid content. A polyimide-molded product is prepared according to the manner in Example 1, and its characteristics are evaluated. The results are shown in Table 1.

Comparative Example 3

Preparation of Polyimide Precursor Composition X-3

Polyamic acid having an acid anhydride terminal is prepared by changing the amount of DOA in Example 1 to 40.00 g (199.75 mmol) and the amount of BPDA to 60.59 g (205.92 mmol). NMP is further added to the obtained polyamic acid-NMP solution, thereby preparing a polyimide precursor composition X-3 containing a 10% of solid content. A polyimide-molded product is prepared according to the manner in Example 1, and its characteristics are evaluated. The results are shown in Table 1.

Comparative Example 4

Preparation of Polyimide Precursor Composition X-4

A polyimide-molded product is prepared according to the manner in Example 1, except that the carbon black is changed to "Toka Black #4500" (pH 6.0, a volatile content of 0.6%) manufactured by Tokai Carbon Co., Ltd, and its characteristics are evaluated. The results are shown in Table 1.

The composition of the polyimide precursor compositions obtained and the evaluation results of the characteristics of the polyimide-molded products obtained from the polyimide precursor compositions are shown in Table 1.

TABLE 1

|  | Example 1 | Example 2 | Example 3 | Example 4 | Example 5 | Example 6 | Example 7 | Example 8 |
|---|---|---|---|---|---|---|---|---|
| Polyimide precursor composition | A-1 | A-2 | A-3 | B-1 | C-1 | C-1 | E-1 | F-1 |
| Solvent | MEK | MEK | MEK | NMP | BL | DOX | MEK/BA = 7/3 | MEK/Xyl = 7/3 |
| Vinyl ether compound | NBVE | NBVE | NBVE | NBVE | NBVE | NBVE | NBVE | NBVE |
| Blocking rate | 1.00 | 0.50 | 0.25 | 1.00 | 1.00 | 1.00 | 1.00 | 1.00 |
| Solid content ratio (%) | 10 | 10 | 10 | 10 | 10 | 10 | 10 | 10 |
| Viscosity (mPas) | 500 | 1000 | 1200 | 500 | 500 | 500 | 500 | 500 |
| Amount of CB mixed in | 30 parts | 30 parts | 30 parts | 30 parts | 30 parts | 30 parts | 30 parts | 30 parts |

TABLE 1-continued

| | | | | | | | | |
|---|---|---|---|---|---|---|---|---|
| Film formability: void | A | A | A | A | A | A | A | A |
| Film formability: surface unevenness, pattern | A | A | A | A | A | A | A | A |
| Dynamic characteristic: tensile strength (MPa) | 230 | 220 | 210 | 190 | 190 | 190 | 180 | 160 |
| Dynamic characteristic: tensile elongation (%) | 100 | 100 | 100 | 100 | 100 | 100 | 90 | 90 |
| Threshold number of times of folding (k time(s)) | 10 | 10 | 10 | 10 | 10 | 10 | 10 | 10 |
| Surface resistance (Log/Ω/square)) | 13.0 | 11.5 | 10.0 | 13.0 | 13.0 | 13.0 | 13.0 | 13.0 |
| Volume resistance (Log/Ω/cm) | 11.6 | 10.3 | 8.8 | 11.6 | 11.6 | 11.6 | 11.6 | 11.6 |
| Image quality: density unevenness | A | A | A | A | A | A | A | A |
| Image quality: spot defect | A | A | A | A | A | A | A | A |
| Terminal structure of polyamic acid | Amino group | Amino group | Amino group | Amino group | Amino group | Amino group | Amino group | Amino group |

| | Example 9 | Example 10 | Example 11 | Example 12 | Example 13 | Example 14 | Example 15 | Example 16 |
|---|---|---|---|---|---|---|---|---|
| Polyimide precursor composition | H-1 | I-1 | J-1 | K-1 | L-1 | M-1 | N-1 | O-1 |
| Solvent | THF | BL | BL | BL | BL | MEK | MEK | BL |
| Vinyl ether compound | NBVE | TBVE | NPVE | DHPy | CHVE | NBVE | NBVE | NBVE |
| Blocking rate | 1.00 | 1.00 | 1.00 | 1.00 | 1.00 | 1.00 | 1.00 | 1.00 |
| Solid content ratio (%) | 10 | 10 | 10 | 10 | 10 | 10 | 10 | 10 |
| Viscosity (mPas) | 500 | 500 | 500 | 200 | 500 | 500 | 500 | 5000 |
| Amount of CB mixed in | 30 part | 30 parts | 30 parts | 30 parts | 30 parts | 30 parts | 30 parts | 30 parts |
| Film formability: void | A | A | A | A | A | A | A | A |
| Film formability: surface unevenness, pattern | A | A | A | A | A | A | A | A |
| Dynamic characteristic: tensile strength (MPa) | 210 | 230 | 239 | 230 | 230 | 230 | 120 | 100 |
| Dynamic characteristic: tensile elongation (%) | 100 | 100 | 100 | 100 | 100 | 100 | 30 | 20 |
| Threshold number of times of folding (k time(s)) | 10 | 10 | 10 | 10 | 10 | 10 | 5 | 5 |
| Surface resistance (Log/Ω/square)) | 13.0 | 13.0 | 13.0 | 13.0 | 13.0 | 13.0 | 11.0 | 11.0 |
| Volume resistance (Log/Ω/cm) | 11.6 | 11.6 | 11.6 | 11.6 | 11.6 | 11.6 | 9.8 | 9.8 |
| Image quality: density unevenness | A | A | A | A | A | A | A | A |
| Image quality: spot defect | A | A | A | A | A | A | A | A |
| Terminal structure of polyamic acid | Amino group | Amino group | Amino group | Amino group | Amino group | Amino group | Anhydride group | Anhydride group |

TABLE 1-continued

|  | Comparative Example 1 | Comparative Example 2 | Comparative Example 3 | Comparative Example 4 |
|---|---|---|---|---|
| Polyimide precursor composition | X-1 | X-2 | X-3 | X-4 |
| Solvent | MEK | NMP | NMP | MEK |
| Vinyl ether compound | None | None | None | NBVE |
| Blocking rate | 0 | 0 | 0 | 1.00 |
| Solid content ratio (%) | Insoluble | 10 | 10 | 10 |
| Viscosity (mPas) | Insoluble | 5000 | 5000 | 500 |
| Amount of CB mixed in | — | 30 parts | 30 parts | 30 parts |
| Film formability: void | — | B | B | B |
| Film formability: surface unevenness, pattern | — | B | B | B |
| Dynamic characteristic: tensile strength (MPa) | — | 220 | 100 | 200 |
| Dynamic characteristic: tensile elongation (%) | — | 100 | 20 | 90 |
| Threshold number of times of folding (k time(s)) | — | 8 | 2 | 8 |
| Surface resistance (Log/Ω/square)) | — | 8.0 | 11.0 | 13.0 |
| Volume resistance (Log/Ω/cm) | — | 7.2 | 9.8 | 11.6 |
| Image quality: density unevenness | — | C | C | C |
| Image quality: spot defect | — | C | C | C |
| Terminal structure of polyamic acid | Amino group | Amino group | Anhydride group | Amino group |

Blocking rate: (molar equivalent of vinyl ether added)/(molar equivalent of a carboxyl group in polyamic acid)
Solid content ratio: solid content ratio of prepared polyamic acid
Amount of CB mixed in: amount of added carbon toted having undergone oxidation treatment based on 100 parts of a polyamic acid resin (based on weight)
Number of times of folding resisted: k in the unit (k time(s)) indicates 1000.
Abbreviations: MEK (methyl ethyl ketone), NMP (N-methyl-2-pyrrolidone), BL (γ-butyrolactone), DOX (1,4-dioxane), BA (butyl acetate), Xyl (xylene), THF (tetrahydrofuran), NBVE (n-butyl vinyl ether, Mw 100.16), TBVE (t-butyl vinyl ether, Mw 100.16), NPVE (n-propyl vinyl ether, Mw 86.13), DHPy (3,4-dihydro-2H-pyran; Mw 84.12), CHVE (cyclohexyt vinyl ether, Mw 126.2)

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor composition comprising:
   a solvent;
   acidic carbon black having a pH of 5.0 or less, and
   a polyimide precursor having a repeating unit represented by the following Formula (I),

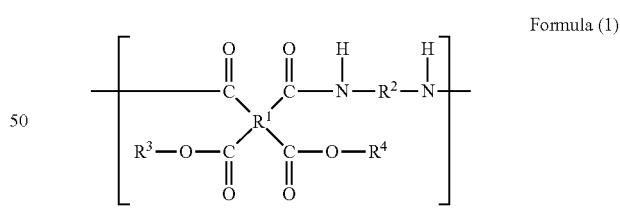

wherein $R^1$ represents a tetravalent organic group, $R^2$ represents a divalent organic group, each of $R^3$ and $R^4$ independently represents a 1-alkoxyethyl group or hydrogen, wherein at least one of $R^3$ and $R^4$ represents hydrogen and $R^3$ and $R^4$ are not hydrogen at the same time.

2. The polyimide precursor composition according to claim 1,
   wherein $R^1$ is a residue obtained by removing four carbonyl groups from a tetracarboxylic dianhydride, and
   the tetracarboxylic dianhydride is at least one selected from the group consisting of 3,3',4,4'-biphenyl tetracarboxylic acid, 2,3,3',4'-biphenyl tetracarboxylic acid pyromellitic acid, and 3,3',4,4'-diphenylether tetracarboxylic acid.

3. The polyimide precursor composition according to claim 1,
wherein $R^1$ is a residue obtained by removing four carbonyl groups from 3,3',4,4'-biphenyl tetracarboxylic acid.

4. The polyimide precursor composition according to claim 1,
wherein $R^2$ is a residue obtained by removing two amino groups from a diamine compound, and
the diamine compound is at least one selected from the group consisting of 4,4'-diaminodiphenylether, 3,4'-diaminodiphenylether, p-phenylenediamine, and m-phenylenediamine.

5. The polyimide precursor composition according to claim 1,
wherein $R^2$ is a residue obtained by removing two amino groups from a diamine compound, and
the diamine compound is 4,4'-diaminodiphenylether or p-phenylenediamine.

6. The polyimide precursor composition according to claim 1,
wherein $R^3$ represents at least one selected from the group consisting of a 1-methyl alkoxyethyl group, a 1-ethyl alkoxyethyl group, a 1-propyl alkoxyethyl group, a 1-butyl alkoxyethyl group, a 1-pentyl alkoxyethyl group, and a 1-cyclohexyl alkoxyethyl group.

7. The polyimide precursor composition according to claim 1,
wherein $R^3$ represents at least one selected from the group consisting of a 1-methyl alkoxyethyl group, a 1-ethyl alkoxyethyl group, and a 1-cyclohexyl alkoxyethyl group.

8. The polyimide precursor composition according to claim 1, comprising at least an amino group on a terminal of the polyimide precursor.

9. The polyimide precursor composition according to claim 1, further comprising a vinyl ether compound.

10. The polyimide precursor composition according to claim 9,
wherein the vinyl ether compound is at least one selected from the group consisting of a vinyl ether compound having a linear or branched saturated or unsaturated hydrocarbon skeleton, a vinyl ether compound containing an alicyclic saturated hydrocarbon skeleton, and vinyl ethers containing an ether bond in a linear or branched saturated or unsaturated hydrocarbon skeleton.

11. A polyimide-molded product formed by performing a heating treatment on a coating film that is formed by coating the polyimide precursor composition according to claim 1 onto a material to be coated.

12. An image forming apparatus comprising:
an image holding member;
a charging unit that charges a surface of the image holding member;
an electrostatic latent image-forming unit that forms an electrostatic latent image on a charged surface of the image holding member;
a developing unit that forms a toner image by developing the electrostatic latent image formed on the surface of the image holding member by using a toner;
an intermediate transfer member that has the polyimide-molded product according to claim 11 as an endless belt;
a primary transfer unit that transfers the toner image formed on a surface of the image holding member to the intermediate transfer member; and
a secondary transfer device that transfers the toner image on the intermediate transfer member to a recording medium.

* * * * *